(12) United States Patent
Bakholdin et al.

(10) Patent No.: US 11,271,452 B2
(45) Date of Patent: Mar. 8, 2022

(54) FLYWHEEL WITH BIFURCATED MOLECULAR PUMP

(71) Applicant: Amber Kinetics, Inc., Union City, CA (US)

(72) Inventors: Daniel Bakholdin, Newbury Park, CA (US); Peter Thomas Tennessen, Oakland, CA (US)

(73) Assignee: AMBER KINETICS, INC., Union City, CA (US)

( * ) Notice: Subject to any disclaimer, the term of this patent is extended or adjusted under 35 U.S.C. 154(b) by 283 days.

(21) Appl. No.: 16/664,910

(22) Filed: Oct. 27, 2019

(65) Prior Publication Data

US 2020/0141471 A1 May 7, 2020

Related U.S. Application Data

(60) Provisional application No. 62/754,115, filed on Nov. 1, 2018.

(51) Int. Cl.
| | |
|---|---|
| *H02K 7/02* | (2006.01) |
| *F04D 19/04* | (2006.01) |
| *F04D 17/16* | (2006.01) |
| *F04D 13/06* | (2006.01) |
| *F16F 15/315* | (2006.01) |

(52) U.S. Cl.
CPC ............ *H02K 7/025* (2013.01); *F04D 17/168* (2013.01); *F04D 19/042* (2013.01); *F04D 13/06* (2013.01); *F16F 15/315* (2013.01)

(58) Field of Classification Search
CPC ...... F04D 19/04; F04D 19/042; F04D 17/168; H02K 7/025
See application file for complete search history.

(56) References Cited

U.S. PATENT DOCUMENTS

| | | | | |
|---|---|---|---|---|
| 5,462,402 | A * | 10/1995 | Bakholdin | H02K 7/025 |
| | | | | 415/90 |
| 6,884,039 | B2 * | 4/2005 | Woodard | F04D 19/044 |
| | | | | 417/51 |
| 8,033,792 | B1 * | 10/2011 | Morando | F04D 7/065 |
| | | | | 416/182 |
| 9,077,211 | B2 * | 7/2015 | Kalev | H02K 7/025 |
| 9,843,237 | B2 * | 12/2017 | Kalev | H02K 7/02 |
| 9,887,604 | B2 * | 2/2018 | Bremer | H02K 7/025 |
| 10,240,660 | B2 * | 3/2019 | Sun | F16F 15/315 |
| 10,944,308 | B2 * | 3/2021 | Englander | F04D 19/042 |
| 2010/0104428 | A1 * | 4/2010 | Tollner | F04D 29/056 |
| | | | | 415/173.1 |

(Continued)

*Primary Examiner* — Christopher S Bobish
(74) *Attorney, Agent, or Firm* — Soquel Group LLC

(57) ABSTRACT

A flywheel device that includes a housing that surrounds a vacuum chamber, a flywheel rotor within the vacuum chamber, which rotates during normal operation of the flywheel, thus agitating residual gasses, an exhaust chamber that receives the exhaust gases from the vacuum chamber, and an annular shaped stationary element, within the vacuum chamber that includes scroll channels where some of the scroll channels have an intake port on an inner diameter of the stationary element and some of the scroll channels have an intake port on an outer diameter of the stationary element, and the scroll channels enable gasses to flow from the vacuum chamber, through the scroll channels, into the exhaust chamber.

9 Claims, 6 Drawing Sheets

(56) References Cited

U.S. PATENT DOCUMENTS

2014/0098380 A1* 4/2014 Fischione ................ G01N 1/28
356/614
2015/0377239 A1* 12/2015 Schofield .............. F04D 23/008
415/90

* cited by examiner

FLYWHEEL WITH BIFURCATED MOLECULAR PUMP

CROSS REFERENCE TO RELATED APPLICATIONS

This application claims the benefit of priority to U.S. Provisional Application No. 62/754,115, filed on Nov. 1, 2018. It is related to co-pending U.S. patent application Ser. No. 15/984,256 filed on May 18, 2018. All of the foregoing are incorporated by reference herein in their entirety for all purposes.

BACKGROUND

1. Field of Art

This invention relates to energy storage using flywheels. More generally, the invention is useful in applications where maintaining a vacuum environment is desired.

2. Description of the Related Art

A flywheel is a type of energy storage system that stores energy as rotational kinetic energy. A flywheel rotor is a mass that spins while physically coupled, directly or indirectly, to a motor that itself is electrically coupled to a converter, such as a back-to-back inverter system, constituting an AC-AC conversion subsystem. When power is received for storage, the motor accelerates the flywheel rotor, increasing its rotational speed. When power is to be extracted, the motor decelerates the flywheel rotor. The faster a flywheel rotor spins the more energy it stores, but the faster it spins the higher the frictional losses due to aerodynamic drag.

To reduce aerodynamic drag, a flywheel typically operates in a housing that is evacuated to medium to high vacuum. For the current embodiment the operating pressure range can be from 0.00001 to 0.100 Torr, or 0.0013 to 13 Pa absolute.

One type of pump that may be used to evacuate a vacuum chamber to very low pressure, such as the above-cited operating pressure range, is a molecular, or turbomolecular pump. A molecular pump works on the principle that gas molecules can be given momentum in a desired direction by repeated collision with a moving solid surface. In a turbomolecular pump, a rapidly spinning rotor 'hits' gas molecules and directs them towards the inlet of a pump and through pump channels into an exhaust region or volume in order to create or maintain a vacuum.

A molecular pump includes a rotating or moving element and a stationary element. When integrated with a flywheel system, a molecular pump takes advantage of flywheel system rotating parts such as the motor, bearings and flywheel rotor to implement the rotating part of the pumping mechanism. By adding a stationary pumping element to an existing flywheel assembly it is possible to integrate a molecular pump capability without adding superfluous rotating components, thus minimizing the overall cost of a flywheel system.

FIG. 1 illustrates an embodiment of a flywheel 100 that incorporates a drag pump 105 that is not integrated with the moving parts of flywheel 100. FIG. 1 is a frontal, crossectional view of flywheel 100. Flywheel 100 includes a housing 110 which contains a vacuum chamber 115. Within vacuum chamber 115 are moving elements including a flywheel rotor 120, an upper shaft 130 that connects to an upper portion of rotor 120, an upper bearing 135, a lower shaft 140 that connects to a lower portion of rotor 120, a lower bearing 145, and a motor/alternator 150. Flywheel 100 also includes a magnetic unloader 155 that lifts rotor 120 during normal operation and a top cap 160 that covers pump 105 and upper bearing 130. In certain embodiments, housing 110 includes a top plate 125. In certain embodiments, housing 110 includes one or more feet 170 or other stabilizing elements.

Pump 105 is a separate device that typically includes a separate rotor, bearings and motor generator. Pump 105 can be any type of pump that is capable of evacuating vacuum chamber 115 to a vacuum or near vacuum, including inter alia a rotary vane pump, a scroll pump, a diaphragm pump. A disadvantage of including a separate pump is that pump 105 does not take advantage of the moving elements of flywheel 100 such as bearings, rotor or motor/generator. By adding redundant moving parts, pump 105 adds significantly to the overall overall system cost.

A difficulty faced by some prior implementations is that integrating the molecular pump components with existing flywheel components results in the high-pressure exhaust gas being conveyed to a volume adjacent to a flywheel rotor, motor or bearing. These moving parts typically have small clearances, typically measured in millimeters. Creating such a local high-pressure region can increase aerodynamic drag and may partially negate the benefits afforded by the reduced pressure in the rest of the housing.

In prior art systems, these integrated molecular pumps primarily take one of two forms, radial flow or axial flow. In the case of the radial flow type, the pump inlet is usually at the outer diameter of a stationary disk/surface containing scroll shaped pumping channels (or grooves) that exhaust the gas molecules out at the inner diameter of the disk. In the case of some flywheel configurations, this exhausts the gas into the region containing the motor-generator components, resulting in additional drag losses than would be experienced if that region could be exhausted by the molecular pump as well.

For example, US Patent Application No. 20130264914 filed on Mar. 23, 2013 discloses embodiments of radial flow molecular pumps, referred to in the application as a "molecular drag pump".

SUMMARY

The subject invention utilizes a novel molecular pump configuration that evacuates gas from a vacuum chamber of a flywheel device into a separate, relatively higher pressure, exhaust chamber. The molecular pump includes a novel stationary element that conveys gas from the vacuum chamber into a higher pressure exhaust chamber located within the vacuum chamber at the top. The molecular pump integrates with a flywheel device and relies on the flywheel rotor, the rotating element of the molecular pump, to propel molecules towards the intake ports on the outer side, or outer diameter, and on the inner side, or inner diameter of the stationary element.

In certain embodiments, the stationary element includes a novel scroll pattern that conveys the molecules from both the outer diameter and the inner diameter upward into the exhaust chamber and away from the moving parts within the flywheel.

Embodiments relate to a flywheel device A flywheel device that includes a housing that surrounds a vacuum chamber, wherein the vacuum chamber, during normal operation, is maintained in a vacuum state, a flywheel rotor disposed within the vacuum chamber, which rotates during normal operation of the flywheel, thereby agitating residual gasses within the vacuum chamber, an exhaust chamber that receives the gases, and an annular shaped stationary element, within the vacuum chamber and attached to the housing, comprising a plurality of scroll channels wherein at least one of the scroll channels has an intake port on an inner diameter of the stationary element and at least one of the scroll channels has an intake port on an outer diameter of the stationary element, and wherein each scroll channel has an exhaust port connected to the exhaust chamber, enabling gasses to flow from the vacuum chamber, through the scroll channels, into the exhaust chamber.

Embodiments further relate to a stationary element of a radial flow molecular pump that integrates with a rotating part within a vacuum chamber, wherein the stationary element has an annular shape, and includes a plurality of scroll channels, where at least one of the scroll channels has an intake port on an inner diameter of the stationary element and at least one of the scroll channels has an intake port on an outer diameter of the stationary element, and where each scroll channel has an exhaust port, enabling gasses to flow from the vacuum chamber, through the scroll channels, and out of the vacuum chamber through the exhaust port.

Embodiments further relate to an embodiment of a stationary element of a bifurcated axial flow molecular pump. The stationary element is generally cylindrical shaped and is intended to encircle an axial, i.e. vertically-oriented, rotor.

BRIEF DESCRIPTION OF DRAWINGS

Non limiting and non exhaustive embodiments of the present invention are described with reference to the following drawings. In the drawings, like reference numerals refer to like parts throughout the various figures unless otherwise specified.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, or devices. The following detailed description is, therefore, not to be taken in a limiting sense.

As used herein the following terms have the meanings given below:

Vacuum chamber or simply chamber—as used herein, refers to a sealed container, enclosure, or vessel that is fully or partially evacuated of gasses. Essentially, the chamber interior is maintained at a lower pressure than exists exterior to the chamber.

Vacuum state or vacuum—as used herein, refers to a full or partial vacuum in a vacuum chamber. It may be appreciated that it is essentially impossible to maintain a total vacuum, thus a vacuum state refers to a chamber that is maintained at near vacuum and more generally at an air pressure substantially less than ambient air pressure. Thus, maintaining a vacuum typically requires continuous, or periodic, evacuation or a pumping of residual gases from the vacuum chamber to the exterior or into another chamber.

Molecular pump, turbomolecular pump or vacuum pump—as used herein, refers to a pump that depends for its action on the adhesion of the gas or vapor molecules to a rapidly moving metal disk or cylinder by which they are carried away. A molecular pump is used to maintain a full or partial vacuum within a vacuum chamber.

Molecular Pump with Bifurcated Air Flow

Figure 1:
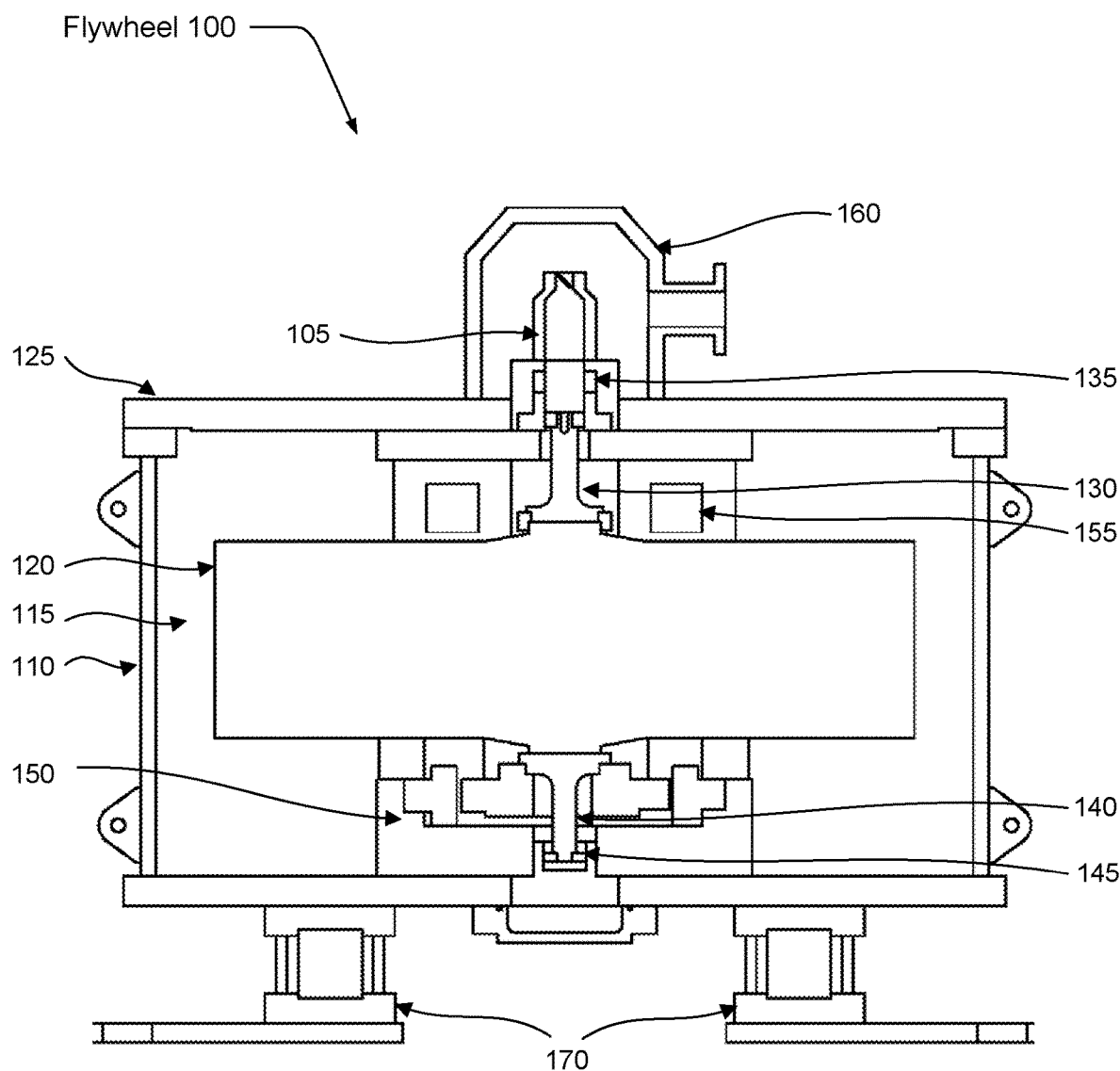
FIG. 1 illustrates an embodiment of a flywheel device that incorporates a separate drag pump that is not integrated with the moving parts of the flywheel.
Figure 2:
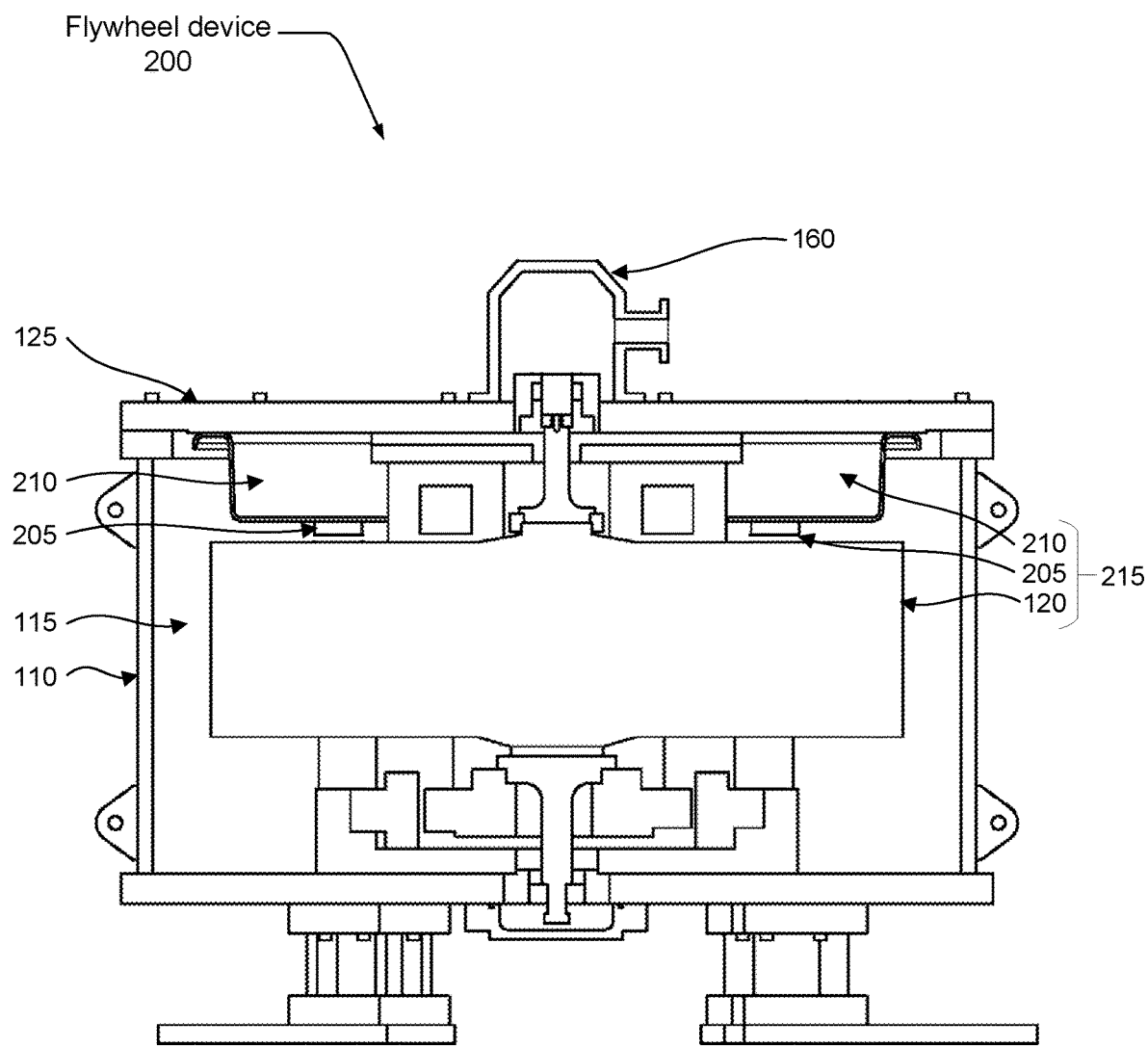
FIG. 2 illustrates an embodiment of a flywheel that includes an integrated molecular pump within a vacuum chamber of the flywheel.

FIG. 2 illustrates an embodiment of a flywheel 200 that provides an integrated molecular pump 215. The molecular pump has a stationary element 205 evacuates gases from vacuum chamber 115 into an exhaust chamber 210. Rotor 120 forms the rotating element of the molecular pump. Thus, molecular pump 215 includes rotor 120, stationary element 205 and exhaust chamber 210. Molecular pump 215 is an embodiment or example of a radial flow molecular pump.

As illustrated, rotor 120 is cylindrical in shape and two journals that extend perpendicularly from either side and assist in coupling the rotor to separate shafts of rotor 120, upper shaft 130 and lower shaft 120. Rotor 120 has a top surface and a bottom surface. In this embodiment, the top and bottom surfaces are substantially planar. In other embodiments, the top and bottom surfaces shape may not be planar. For example, in certain embodiments rotor 120 may also include elements on its outer surface, for example discrete masses to provide centrifugal loading. As another example, U.S. patent application Ser. No. 15/984,256, filed on May 18, 2018 describes a "fishtail" shaped rotor.

Rotor 120 is generally rotationally symmetric, and thus the rotor can be described using a cylindrical coordinate system where the origin is through the center rotational axis of the rotor. In implementations including other elements on the outer surface, such as discrete masses, the rotor and the discrete mass elements are both uniformly distributed about the origin.

To provide an example of scale, in certain embodiments, rotor 120 is between 36-72 inches in diameter, and weighs between 2-5 tons. It may be appreciated by one of ordinary skill in the art that the present invention is not limited to a particular rotor shape, composition or dimensions. The aforegoing details are provided solely as example and are not intended to be limiting.

Stationary element 205 is annulus shaped, i.e. a cylinder with a central cut-out region, and encircles the upper flywheel mechanism which includes bearing 135, upper shaft 130 and magnetic unloader 155. Stationary element 205 is thus positioned axially above rotor 120. Typically, the lower extent of stationary element 205 is positioned close to rotor 120 to benefit from the increased molecular agitation caused by rotor 120. The distance or clearance between the lower extent of stationary element 205 and the top surface of rotor 120 is typically in the range of 2-20 millimeters.

Pump 215 intake takes place at both an inner diameter and an outer diameter of stationary element 205. In certain embodiments, it includes an annulus-shaped top cover, an annulus-shaped bottom cover, and a series of channels between bottom cover and top cover. In certain embodiments, stationary element 205 has a bifurcated, radial airflow that enables it to draw gases from vacuum chamber 115 into exhaust chamber 210. For purposes of this discussion, while exhaust chamber 210 is positioned within vacuum chamber 115 it is considered as a separate part, i.e. not a part of vacuum chamber 115. Generally, exhaust chamber 210 may be positioned within vacuum chamber 115 or exterior to it without departing from the scope and spirit of the present invention.

Figure 3A:
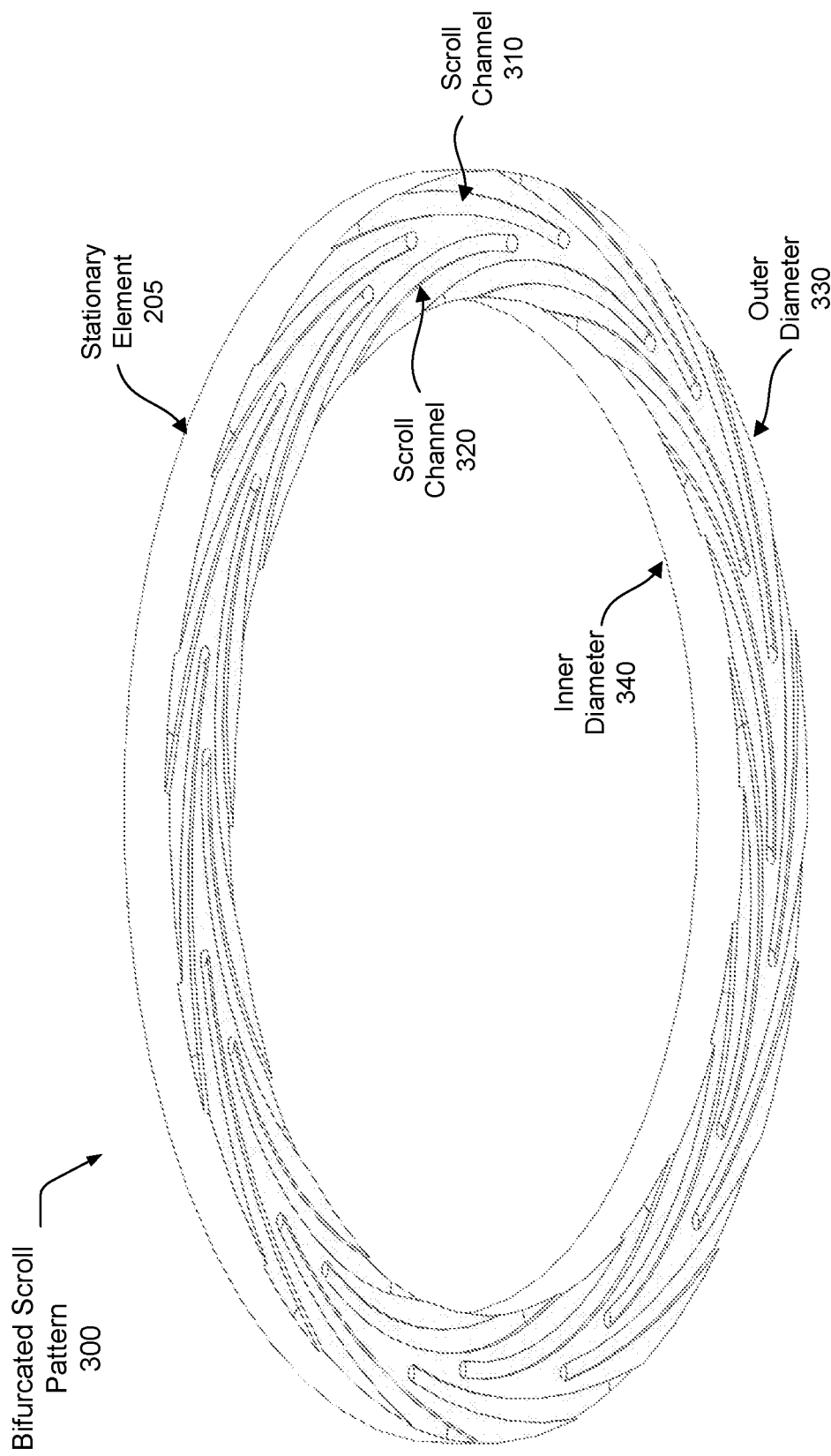
FIG. 3A is a top view of an exemplary, bifurcated, scroll pattern that may be used in a stationary element of the molecular pump of FIG. 2.
Figure 3C:
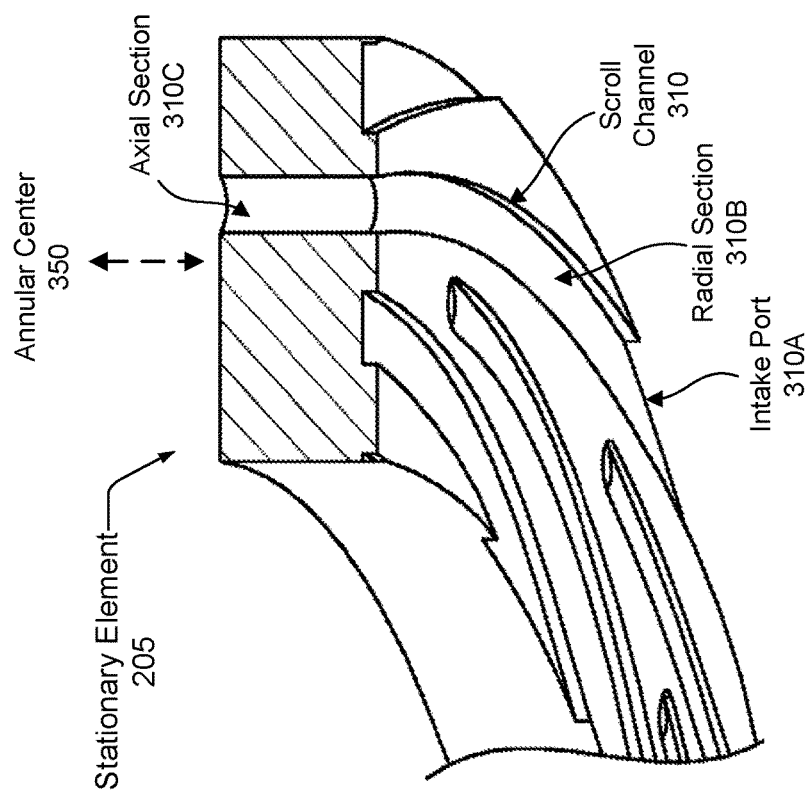
FIG. 3C illustrates an axial section of a scroll channel.
Figure 3B:
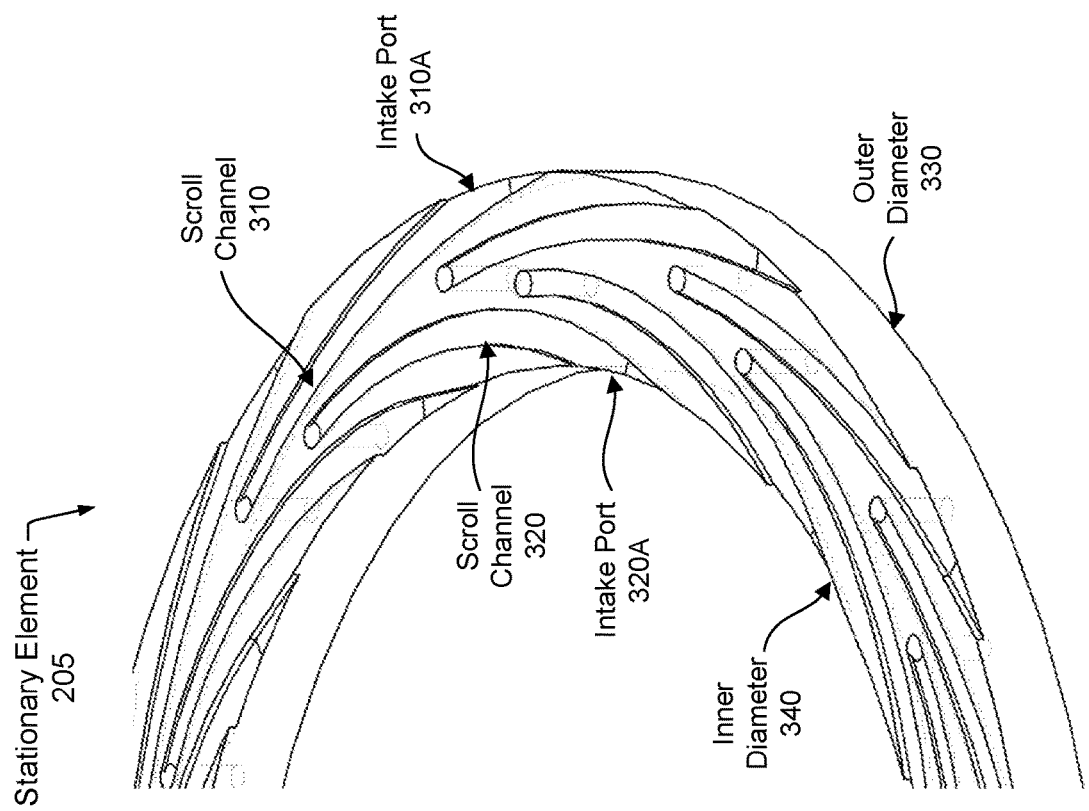
FIG. 3B illustrate scroll channels that taper in diameter from an intake port on an outer diameter or on an interior diameter of the stationary element into its middle.

FIGS. 3A-3C illustrates an exemplary, bifurcated, scroll pattern that may be used in stationary element 205 of the molecular pump of FIG. 2. FIG. 3A is a top view of the scroll pattern. Contrary to prior art scroll patterns in which scroll or exhaust channels traverse the entire distance between an outside or diameter 330 and an inner side or diameter 340 of the pumping mechanism, stationary element 205 includes scroll channels 310, 320 that curve radially inward, towards an annular center 350 (depicted in FIG. 3C) of stationary element 205, and then angle sharply upward, axially, and exhaust through holes or exhaust ports (not depicted) into the bottom of exhaust chamber 210. Scroll channels 310 have intake ports 310A on outer diameter 330 while scroll channels 320 have intake ports 320A on inner diameter 340 of stationary element 205. The bottom of exhaust chamber 210 has intake ports or openings (not depicted) to receive exhaust through the exhaust ports of stationary element 205.

As illustrated in FIG. 3B, scroll channels curve and taper in diameter from an intake port on outer diameter 330 or on inner diameter 340 of stationary element 205 towards annular center 350 (depicted in FIG. 3C). Thus, scroll channel 310 has an intake port 310A on outer diameter 330 of stationary element 205. And, scroll channel 320 has an intake port 320A on inner diameter 340. In this context, tapering means a decrease in cross-sectional area of a scroll channel from the intake port to the center of stationary element 205.

FIG. 3C illustrates an axial section of scroll channel 310. As illustrated, gas enters intake port 310A of scroll channel 310, from vacuum chamber 115, having been excited or agitated by rotor 120. The gas travels first through a curved radial section 310B and then upward through an axial section 310C and exits through an exhaust port into an opening in the bottom of exhaust chamber 210.

In general, gas molecules, agitated by the movement of rotor 120 enter an intake port of a scroll channel and travel through a first, radial, section of the scroll channel towards the annular center 250 of stationary element 205, and then through a second, axial, section upward into exhaust chamber 210. Thus, after a period of operation, exhaust chamber 210 reaches a relatively higher atmospheric pressure than is present in vacuum chamber 115.

Figure 4:
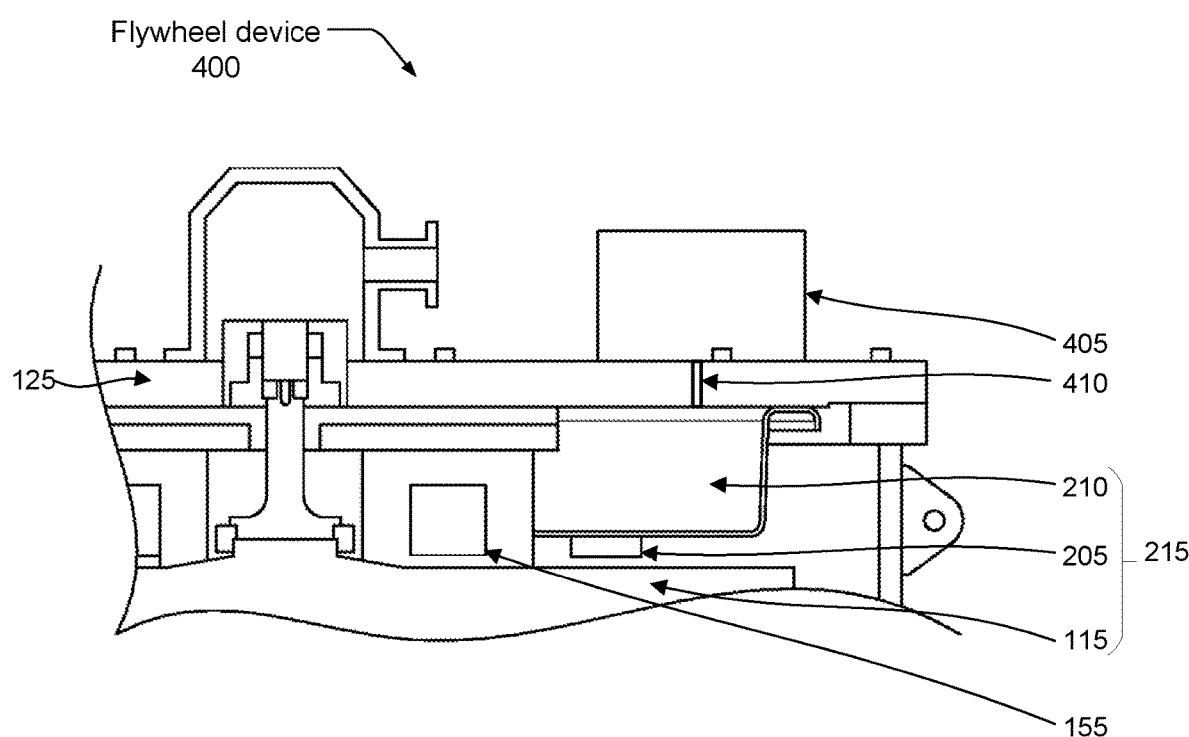
FIG. 4 illustrates an embodiment of a flywheel 400 that integrates a molecular pump within a vacuum chamber of the flywheel, which exhausts gases into an exhaust chamber, and which adds a second pump to evacuate the exhaust chamber.

FIG. 4 illustrates an embodiment of a flywheel 400 that integrates a molecular pump within vacuum chamber 115, which exhausts gases into exhaust chamber 210, and which adds a second pump 405 to evacuate exhaust chamber 210. FIG. 4 is a close-up cross sectional view of pump 405. Essentially, flywheel 400 is an embodiment of flywheel 200 that adds pump 405 that mounts on top plate 125. In this embodiment, molecular pump 215 is considered as a first vacuum pump and pump 405 is considered as a second vacuum pump.

Pump 405 draws gases from exhaust chamber 210 through an exhaust channel 410 that links pump 405 and exhaust chamber 210. It typically exhausts the gases into the atmosphere, i.e. exterior to flywheel 100. Pump 405 can be any type of pump that is capable of evacuating exhaust chamber 210 to a vacuum or near vacuum, including inter alia a rotary vane pump, a scroll pump, a diaphragm pump. Typically, pump 405 is a commercially available vacuum pump that can be mounted on top plate 125 or elsewhere on the interior or exterior of housing 110.

In certain embodiments, pump 405 is mounted within exhaust chamber 210. In other embodiments, pump 405 is mounted within vacuum chamber 115. In yet other embodiments, pump 410 is mounted exterior and at a distance from flywheel 100. For example, pump 405 may be mounted on the side of flywheel 100 and attached to housing 110. Or, pump 405 may be mounted exterior and at a distance from flywheel 100.

Stationary Element for an Axial Flow Molecular Pump with Bifurcated Air Flow

Figure 5:
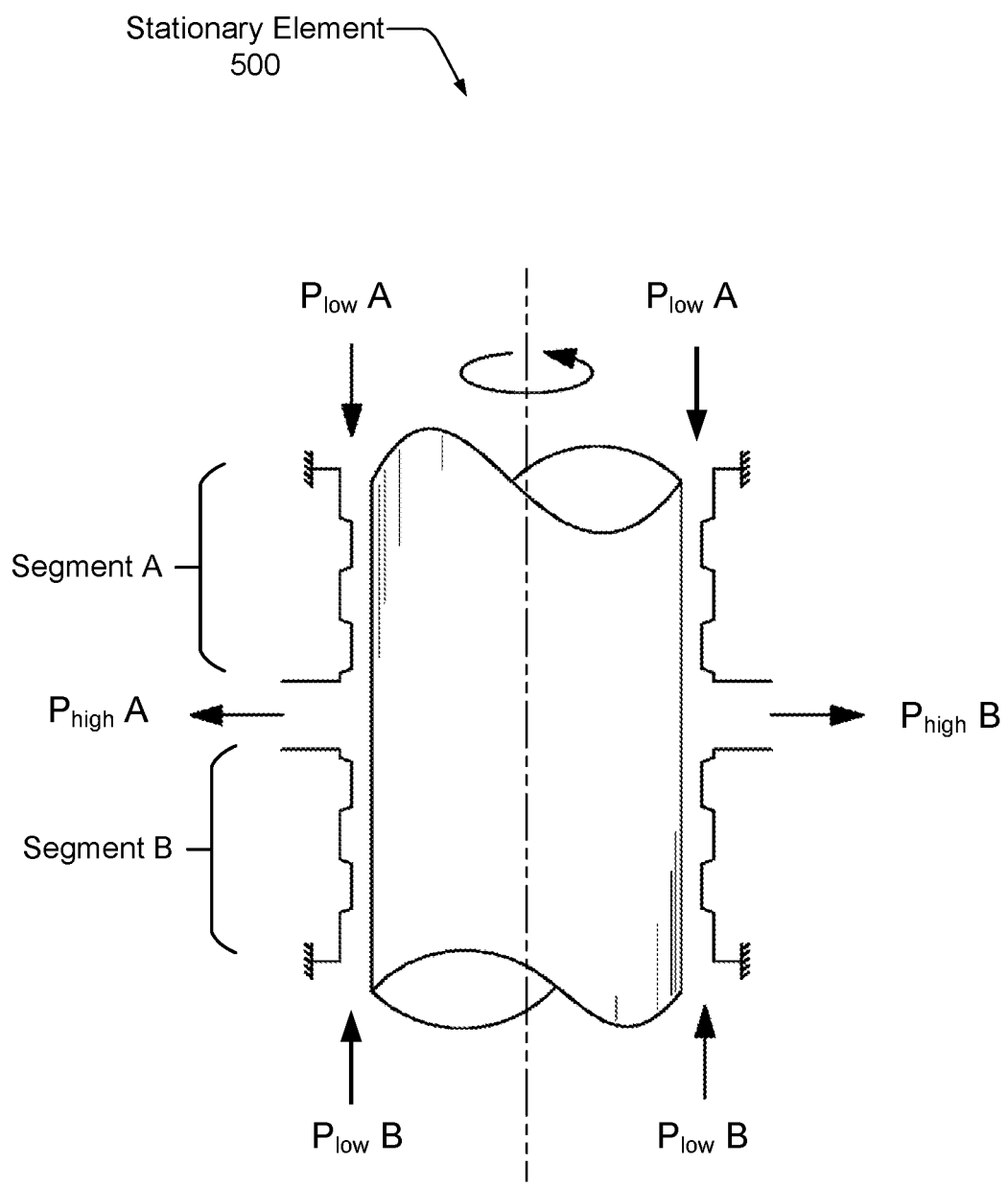
FIG. 5 illustrates an embodiment of a stationary element of a bifurcated axial flow molecular pump.

FIG. 5 illustrates an embodiment of a stationary element 500 of a bifurcated axial flow molecular pump. Stationary element 500 is generally cylindrical shaped and is intended to encircle an axial, i.e. vertically-oriented, rotor. The axial rotor (not depicted) is positioned inside of, axially centered within, stationary element 500. It draws exhaust gases through intake ports, labeled Plow A, Plow B, where Plow A refers to helical scroll channels whose intake ports are at the top of stationary element 500 and Plow B refers to helical scroll channels whose intake ports are at the bottom of stationary element 500. The helical scroll channels of Plow A curve downward while the helical scroll channels of Plow B curve upward. Stationary element 500 includes a top segment, segment A, with a plurality of helical scroll channels and a bottom segment, segment B, with a plurality of helical scroll channels. All helical scroll channels exhaust through ports, labeled Phigh A and Phigh B, located midway along the axial length of stationary element 500. As with stationary element 205, the scroll channels are tapered and have a larger cross-sectional area at the intake side than the exhaust side. Stationary element 500 is bifurcated in that it has two exhaust ports rather than one.

In this embodiment, the scroll channels of the two pumping segments, segment A and segment B, have opposite helical pitch (axially opposing flow direction), to accommodate the common rotational direction.

In this embodiment, the scroll channels of each segment have equal arclength, inlet cross section and outlet cross section. Thus, the performance of each set of scrolls is very nearly equal, ensuring that the pumping ratios are also equal. This ensures equally low pressures on both sides and prevents bypass flow across the pump from one intake side to the other.

In another embodiment, there is an imbalance between the scrolls channels of segments A and B, allotting more cross-sectional area to one side than the other, in order to reduce operating pressure in a more critical area of the machine while allowing another area to rise slightly higher. The same approach can be used if there is a significantly higher gas load on one side of the pump than the other. This approach may require separate outlet manifolds for the inner and outer set of scroll channels to prevent backflow.

In yet another embodiment, each pair of scrolls meet at a single shared outlet. This would allow for a larger outlet cross section and potentially simplify outlet side manifolds by halving the number of outlet connections.

In yet another embodiment, a circumferential groove connects all of the scroll outlets, both inside and outside. This would reduce the likelihood of gas molecules escaping back towards the inlet.

It may be appreciated that molecular pump 215 may be integrated with devices other than flywheel energy storage devices, provided that the device being integrated has moving part that operate in a vacuum chamber. Thus, the utility of the subject invention is not limited to flywheel energy storage devices. Examples of other types of devices that may include the subject invention includes transportation devices, such as automobiles, as well as other energy storage and production devices.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A flywheel device, comprising:
   a housing that surrounds a vacuum chamber, wherein the vacuum chamber, during normal operation, is maintained in a vacuum state;
   a flywheel rotor disposed within the vacuum chamber, which rotates during normal operation of the flywheel, thereby agitating residual gasses within the vacuum chamber;
   an exhaust chamber, attached to a top plate of the housing, which receives the gases; and
   an annular shaped stationary element, within the vacuum chamber and attached to the housing, disposed above the flywheel rotor and below the exhaust chamber, comprising a plurality of scroll channels, each scroll channel having an intake port inside the vacuum chamber and an exhaust port connected to the exhaust chamber, enabling gasses to flow from the vacuum chamber, through the scroll channels, into the exhaust chamber.

2. The device of claim 1, wherein at least one of the scroll channels has an intake port on an inner diameter of the stationary element and at least one of the scroll channels has an intake port on an outer diameter of the stationary element.

3. The device of claim 2, wherein the drag pump mounts on top of the top plate and connects to the exhaust chamber through an exhaust channel through the top plate.

4. The device of claim 1, wherein each scroll channel exhaust port connects to an opening in the bottom of the exhaust chamber.

5. The device of claim 1, wherein each scroll channel comprises two sections: a first section that curves towards an annular center of the stationary element; and a second section that angles upward.

6. The device of claim 5, wherein the first section of each scroll channel channels tapers from its intake port to a junction with the second section.

7. The device of claim 1 further comprising a drag pump, that connects to the exhaust chamber.

8. The device of claim 7, wherein the drag pump is disposed inside the vacuum chamber and mounts to the housing and connects to the exhaust chamber via an exhaust channel and exhausts gasses to the exterior of the housing through an exhaust port.

9. The device of claim 7, wherein the drag pump is a type of pump selected from the group consisting of a rotary vane pump, a scroll pump, and a diaphragm pump.

* * * * *